United States Patent [19]

Gunjima et al.

[11] Patent Number: 4,834,509
[45] Date of Patent: May 30, 1989

[54] LIQUID CRYSTAL OPTICAL DEVICE AND PROCESS FOR ITS PRODUCTION AND METHOD FOR ITS OPERATION

[75] Inventors: Tomoki Gunjima; Hiroshi Kumai, both of Yokohama; Shoichi Tsuchiya, Sagamihara; Kaoriko Masuda, Fujisawa, all of Japan

[73] Assignee: Asahi Glass Company Ltd., Tokyo, Japan

[21] Appl. No.: 133,641

[22] Filed: Dec. 16, 1987

[30] Foreign Application Priority Data

Dec. 23, 1986 [JP] Japan ................................ 61-305528

[51] Int. Cl.$^4$ .............................................. G02F 1/13
[52] U.S. Cl. .............................................. 350/347 V
[58] Field of Search ................................ 350/347 V

[56] References Cited

U.S. PATENT DOCUMENTS

| | | | |
|---|---|---|---|
| 3,961,840 | 6/1976 | Morokawa et al. | 350/332 |
| 4,435,047 | 3/1984 | Fergason | 350/334 |
| 4,596,445 | 6/1986 | Fergason | 350/347 V |
| 4,643,528 | 2/1987 | Bell, Jr. | 350/334 |
| 4,671,618 | 6/1987 | Wu et al. | 350/347 V |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |
| 4,715,686 | 12/1987 | Iwashita et al. | 350/337 |
| 4,728,547 | 3/1988 | Vaz et al. | 350/331 R |

OTHER PUBLICATIONS

Lechner, Bernard and Frank Marlowe and Edward Nester and Juri Tults, "Liquid Crystal Matrix Displays", *IEEE*, vol. 59, No. 11, Nov. 1971, pp. 1566–1579.
H. G. Craighead et al., *Applied Physics Letters*, vol. 40, pp. 22–24 (1982).

*Primary Examiner*—Stanley D. Miller
*Assistant Examiner*—Anita E. Pellman
*Attorney, Agent, or Firm*—Oblon, Spivak, McClelland, Maier, & Neustadt

[57] ABSTRACT

A liquid crystal optical device comprising a pair of substrates provided with electrodes and a layer containing a liquid crystal material sandwiched between the pair of substrates, wherein said layer is formed by irradiating light to a solution of a nematic liquid crystal material and a photo-curable vinyl compound selected so that the refractive index of the resulting cured product agrees to either the ordinary refractive index ($n_o$) or the extraordinary refractive index ($n_e$) of the nematic liquid crystal material used, or the refractive index ($n_x$) of the nematic liquid crystal material when it is randomly oriented, held between the pair of substrates provided with electrodes, to cure the photo-curable vinyl compound and fix the resulting phase separation of the nematic liquid crystal material and the cured product.

16 Claims, 1 Drawing Sheet

LIQUID CRYSTAL OPTICAL DEVICE AND PROCESS FOR ITS PRODUCTION AND METHOD FOR ITS OPERATION

The present invention relates to a liquid crystal optical device of light transmission and scattering type, a process for its production and a method for its operation.

Heretofore, two modes i.e. a dynamic scattering (DS) mode and a phase change (PC) mode are known for liquid crystal optical devices utilizing light scattering as the operational principle. In the DS mode, a liquid crystal material having a conductive substance incorporated therein and having a negative dielectric anisotropy is sealed in a pair of substrates treated for homogeneous or homeotropic alignment and provided with transparent electrodes, and it is designed to control two states i.e. a transmitting state where no voltage is applied and a state where a voltage higher than the threshold voltage is applied to cause dynamic scattering and thereby to reduce the transmittance. Whereas, in the PC mode, a cholesteric liquid crystal material is sealed in a pair of substrates provided with transparent electrodes, which are optionally treated for alignment, and it is designed to control two states i.e. a state of a nematic phase in homeotropic alignment (transmitting) and a state of a cholesteric phase in focalconic or planar alignment (scattering) by the application or non-application of a voltage. Both the DS and PC modes have an advantage that a wide viewing angle is obtainable since no polarizing film is used in either mode. However, the DS mode has a drawback that since it is a current effect mode with a conductive substance added to the liquid crystal material, the power consumption is large and the reliability of the liquid crystal material is low. The PC mode has also a difficult problem such that since the operation voltage depends upon the ratio of the cell gap to the pitch of liquid crystals, a highly precise uniform gap is required to enlarge the display surface area.

On the other hand, H. G. Craighead et al. have disclosed in Appln. Phys. Lett., 40 (1) 22 (1982) a method which utilizes the feature that liquid crystal has birefringence. Specifically, the liquid crystal is impregnated in a porous material, and by the application or non-application of an electric field, the refractive index of the liquid crystal is changed, whereby the transmittance and the scattering are controlled by adjusting the difference in the refractive index from the porous material. This method is useful in that the drawback of the DS and PC modes can be overcome in principle without employing polarizing films. Similar devices have been prepared by J. L. Fergason et al. who used nematic liquid crystal encapsulated by means of polyvinyl alcohol (U.S. Pat. No. 4,435,047), by K. N. Pearlman et al. who used liquid crystal having various latexes taken therein (European Patent Application Publication No. 156615), and by J. W. Doane et al. who used a method of dispersing liquid crystal in an epoxy resin, followed by curing (International Application Publication No. 85-4262).

The method of H. G. Craighead et al. had drawbacks that no adequate variation in the transmittance is obtainable and the preparation of a device is difficult because it employs a process of impregnating liquid crystal into a porous material and thus has problems such that the impregnation of the liquid crystals is difficult when there are irregularities in the size of pores of the porous material used and the proportional ratio between the porous material and the liquid crystal can not freely be selected. Likewise, the devices of J. L. Fergason et al. and K. N. Pearlman et al. had drawbacks that they tend to have white turbidity or undergo swelling, thus leading to a deterioration of the physical properties, because they are inferior in the water resistance since they employ a water soluble polymer or a polymer emulsified and dispersed in water. J. W. Doane et al. disclose a method wherein an epoxy resin is cured by ultraviolet rays. The epoxy resin undergoes ion polymerization, but does not undergo radical polymerization. Therefore, the polymerization is conducted by an acid formed by the decomposition of a salt of a Lewis acid or a proton acid with the ultraviolet rays. Therefore, this method had drawbacks that the quality of the outer appearance or the reliability of the device is poor because of by-products or free acids formed by the decomposition of the salt.

It is an object of the present invention to overcome the above-mentioned drawbacks inherent to the conventional methods.

The present invention provides a liquid crystal optical device comprising a pair of substrates provided with electrodes and a layer containing a liquid crystal material sandwiched between the pair of substrates, wherein said layer is formed by irradiating light on a solution of a nematic liquid crystal material and a photo-curable vinyl compound selected so that the refractive index of the resulting cured product agrees with either the ordinary refractive index ($n_0$) or the extraordinary refractive index ($n_e$) of the nematic liquid crystal material used, or the refractive index $n_x$) of the nematic liquid crystal material when it is randomly oriented, held between the pair of substrates provided with electrodes, to cure the photo-curable vinyl compound and fix the resulting phase separation of the nematic liquid crystal material and the cured product.

The present invention also provides a process for producing a liquid crystal optical device, which comprises supplying a mixture of a liquid crystal material and a resin between a pair of substrates provided with electrodes and curing the mixture, wherein used as said mixture is a solution of a nematic liquid crystal material and a photo-curable vinyl compound selected so that the refractive index of the resulting cured product agrees with either the ordinary refractive index ($n_0$) or the extraordinary refractive index ($n_e$) of the nematic liquid crystal material used, or the refractive index ($n_x$) of the nematic liquid crystal material when it is randomly oriented, and the solution is held between the pair of substrates provided with electrodes and irradiated with light to cure the photo-curable vinyl compound and fix the resulting phase separation of the nematic liquid crystal material and the cured product.

Further, the present invention provides a method for operating such a liquid crystal optical device, wherein when a voltage is to be applied, an AC voltage is applied, and when no voltage is applied, the two electrodes are short-circuited with an impedance lower than the impedance of the layer comprising the nematic liquid crystal material and the cured product.

BRIEF DESCRIPTION OF THE DRAWING

A more complete appreciation of the invention and many of the attendant advantages thereof will be readily obtained as the same become better understood by reference to the following detailed description when considered in connection with the accompanying drawing, wherein.

Figure 1:
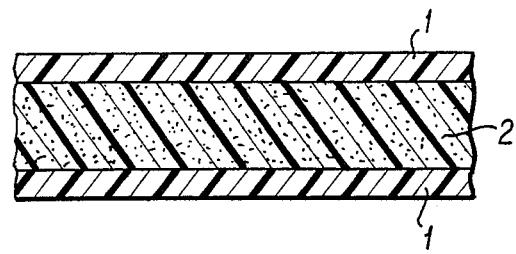
FIG. 1 represents an optical liquid crystal device according to the present invention, wherein reference numeral 1 identifies the substrate and reference numeral 2 identifies the layer containing the liquid crystal material.

Now, the present invention will be described in detail with reference to the preferred embodiments.

In the device of the present invention, the nematic liquid crystal material and the cured product are fixed in a fine heterogeneous state resulted from a homogeneously dissolved state of the liquid crystal material and the photo-curable vinyl compound by the photo-curing step, whereby the distribution of the liquid crystal material and the cured product is uniform, thus presenting a device having a high quality of the outer appearance with excellent productivity.

In the present invention, the refractive index of the cured product formed by the irradiation with light is adjusted to agree to either the ordinary refractive index ($n_0$) or the extraordinary refractive index ($n_e$) or the nematic liquid crystal material used, or the refractive index ($n_x$) of the nematic liquid crystal material when it is randomly oriented, in either the state where a voltage is not applied or the state where a voltage is applied. Thus, it is designed so that light is transmitted when the refractive index of the cured product agrees to the refractive index of the liquid crystal material and light is scattered (white turbidity) when the refractive index of the cured product does not agree to the refractive index of the liquid crystal material. With this characteristic, the liquid crystal optical device of the present invention is highly effective for use as a light-controlling device.

Further, by adjusting the refractive index of the cured product to $n_0$ or $n_e$, the device of the present invention may be designed so that when no electric field is applied, it is in a scattering state (i.e. a turbid state) due to the difference in the refractive index between the non-oriented liquid crystal material and the cured product, and when an electric field is applied, it is in a transmitting state as the liquid crystal substance is aligned so that the refractive index ($n_0$ or $n_e$) of the liquid crystal material agrees to the refractive index of the cured product obtained by photo-curing, thus presenting a device having an excellent reversible light controlling function.

It is particularly preferred to use a combination of a nematic liquid crystal material having a positive dielectric anisotropy and a photo-curable vinyl compound selected so that the refractive index of the resulting cured product agrees to $n_0$ of the nematic liquid crystal material used, because the alignment of the liquid crystal during the application of an electric field should preferably be perpendicular to the substrate to attain high transmittance.

Further, the device of the present invention may be designed so that the refractive index of the cured product formed by the photo-curing agrees to the refractive index ($n_x$) when the nematic liquid crystal material is randomly oriented. Here, the "randomly oriented" is meant for a state where liquid crystal molecules are directed to various directions under the influence of the network for the cured product without being aligned in a direction parallel or perpendicular to the plane of the substrate. In this case, when no electric field is applied, the refractive index of the non-oriented (randomly oriented) liquid crystal material agrees to the refractive index of the cured product, and the device is in a transmitting state. Inversely, when an electric field is applied, the liquid crystal material is aligned, whereby the refractive index ($n_0$ or $n_e$) of the liquid crystal material will not agree to the refractive index of the cured product formed by the photo-curing, and the device will be in a scattering state (i.e. a turbid state). Thus, when no voltage is applied, the device will be transparent. However, the cured product formed by the photo-curing is present in a network form, and the liquid crystal is randomly oriented under the influence of this cured product, whereby it is difficult to obtain a uniform state. Namely, it is readily possible to obtain a uniform alignment in the case of the homogeneous or homeotropic alignment. Whereas, it is difficult to obtain a uniform random orientation, because microscopically or locally the state of orientation varies delicately thus presenting a difference in the refractive index, which in turn is likely to be observed as haze irregularities, although the random orientation is macroscopically random.

In the present invention, the refractive index of the cured product and the refractive index (either $n_0$, $n_e$ or $n_x$) of the liquid crystal material should preferably be in exact agreement. However, they may not be in exact agreement and may substantially be in agreement so that the transmitting state is not adversely affected. Specifically, the difference in the refractive indices should preferably be not larger than 0.15. Namely, the cured product will be swelled by the liquid crystal material, whereby the refractive index of the cured product tends to be closer to the refractive index of the liquid crystal material than the original refractive index of the cured product, and light will be transmitted even if a difference of this degree exists between the refractive indices.

A photo-cure initiator may be added to the photo-curable vinyl compound used in the present invention in order to facilitate the curing. A device having excellent quality of the outer appearance and excellent reliability can be prepared with a compound photo-curable by a radical species. The photo-curable vinyl compound may be such that the compound itself is photo-reactive, or may be such that the curing is induced by a substance formed by the irradiation with light. Such compounds may be classified into those which are decomposed by the irradiation with light for curing and those which are polymerized by the irradiation with light for curing. Those curable by polymerization may further be divided into those which undergo dimerization by light and those which undergo polymerization to form polymers. Those belonging to the former have a cinnamoyl group or a cinnamylidene group as the vinyl group, in many cases. For example, polyvinyl cinnamate, polycinnamylidene vinyl acetate or a phenylenediacrylate may be mentioned. The latter include monomers or oligomers which are activated by light and polymerize by themselves or with other polymers, oligomers or monomers for curing. As the vinyl group, an acryloyl-type, an allyl-type, a spirane-type or a vinlybenzene-type monomer, oligomer or polymer may be mentioned. Specifically, compounds having monofunctional and polyfunctional vinyl groups may be mentioned which are represented by, for example, a monoacrylate, a diacrylate, an N-substituted acrylamide, an N-vinylpyrrolidone, styrene and its derivatives, a polyol acrylate, a polyester acrylate, a urethane acrylate, an epoxy acrylate, a silicone acrylate, a fluoroalkyl acrylate, a polyacrylate having a polybutadiene structure, a polyacrylate having an isocyanuric acid structure, an acrylate having a hydantoin structure and an unsaturated cycloacetal.

In the present invention, such various photo-curable vinyl compounds may be employed. However, it is preferred to use acryloyl compounds since they are excellent in the phase separation into the liquid crystal material and the cured product upon irradiation with light and in its uniformity, and the curing rate by the irradiation with light is high and the cured product is stable. Here, the acryloyl group of the acryloyl compounds may have the hydrogen atom at the α-position or β-position substituted by a phenyl group, an alkyl group, a halogen atom or a cyano group.

In the present invention, among these photo-curable vinyl compounds, those curable by polymerization upon irradiation with light, particularly those containing polymerizable oligomers, are preferred.

Specifically, such a photo-curable vinyl compound preferably contains from 15 to 70% by weight of an acryl oligomer having at least two vinyl groups, whereby the shrinkage due to curing after the photo-curing operation is minimum and fine cracks scarcely form in the liquid crystal optical device, and thus the moldability will be improved. If fine cracks increase, the light transmittance in a light transmitting state tends to decrease, and the performance of the device tends to be poor. The viscosity of this acryl oligomer is preferably from 150 to 50,000 cps at 50° C. If the viscosity is too high or too low, the moldability tends to be inferior.

For the rest of the photo-curable vinyl compound, a vinyl-type monomer may be employed. An acryl monomer is particularly preferred, since it has good compatibility with the acryl oligomer.

A preferred acryl oligomer useful for the present invention has the following formula I.

$$CH_2=CH-\underset{\underset{O}{\|}}{C}-O-X-\underset{\underset{O}{\|}}{C}-CH=CH_2 \qquad (I)$$

wherein X may be selected from units of e.g. a polyol, a polyester, an epoxy, a urethane or a hydantoin, which have an acrylic acid structure ($CH_2=CH-COO-$) at both ends. Specifically, X may have the following structures: $-(R-O)_{\overline{n}}$ such as 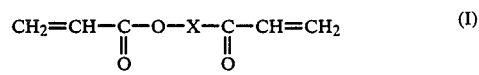

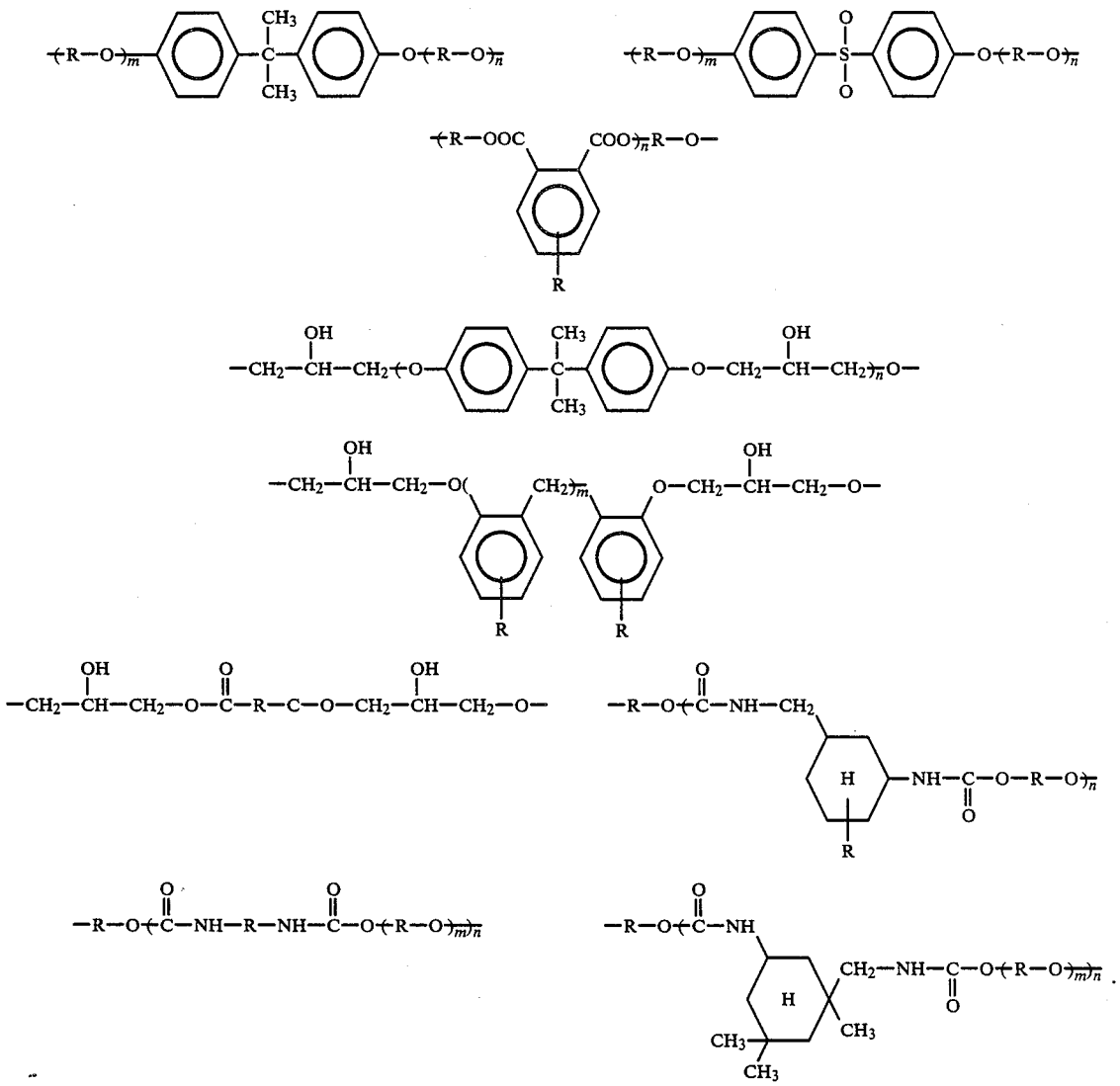

-continued

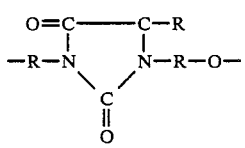

In the above formulas, R is an alkylene group, and R' is a hydrogen atom or an alkyl group, which may be substituted by phenylene or cyclohexylene. When a plurality of R or R' are present in the same structure, they may be the same or different groups.

The above units represent mere examples. X may suitably be selected taking the shape or properties of the device into consideration.

The photo-curable vinyl compounds may be used alone or in combination as a mixture of a plurality of compounds. Such a photo-curable vinyl compound may contain a modifier required for the preparation of a device, or a modifier for the prepared device. Specifically, it may contain a cross-linking agent, a surfactant, a diluting agent, a thickener, a deforming agent, an adhesive, a stabilizer, an absorber, a colorant, a polymerization accelerator, a chain transfer agent or a polymerization inhibitor.

The photo-curable vinyl compound to be used for the device of the present invention may be suitably selected among various materials which meet the above requirements, taking into consideration the refractive index of the liquid crystal material and the compatibility with the liquid crystal material.

As the photo-cure initiator, a benzoin ether-type, a benzophenone-type, an acetophenone-type or a thioxanthone-type initiator may be mentioned.

The nematic liquid crystal material used in the present invention may be used alone or may be used in the form of a composition. However, in order to satisfy various requirements such as the operational temperature range and the operational voltage, it is advantageous to use it in the form of a composition.

The nematic liquid crystal material is required to be uniformly dissolved with the photo-curable vinyl compound and insoluble or hardly soluble with the cured product formed by the irradiation with light. When a composition is used, it is preferred that the solubility of individual liquid crystal materials is close to one another.

For the preparation of a device of the present invention, the photo-curable vinyl compound and the nematic liquid crystal material may be mixed in a weight ratio of from 5:95 to 45:55, and the mixture may be used in the form of a liquid or a viscous liquid. Namely, for the preparation of the device of the present invention, the mixture of the photo-curable vinyl compound and the nematic liquid crystal material may be prepared in the form of a liquid or a viscous liquid so long as it is uniformly dissolved. The optimum condition may be selected depending upon the particular method for the preparation of the device. For example, for a cell comprising a pair of glass substrates provided with transparent electrodes made of e.g. $In_2O_3$—$SnO_2$ or $SnO_2$, facing to each other and sealed along their periphery, it is usually convenient that the mixture is injected in a liquid form. Otherwise, when the mixture is coated on one of the substrates made of e.g. a plastic or glass provided with transparent electrodes and then the other substrate is overlaid thereon, it is usually convenient to employ the mixture in a viscous state.

The device may be operable with a cell gap of from 5 to 100 $\mu m$. However, taking the applied voltage and the contrast between the on and off states, the cell gap is preferably set within a range of from 7 to 40 $\mu m$. Then, the mixture held between the substrates is irradiated with light to fix the nematic liquid crystal material and the cured product in their phase separated state. Here, the irradiation with light usually means ultraviolet irradiation or electron beam irradiation. When the refractive index of the cured product is adjusted to agree to $n_0$ or $n_e$ of the liquid crystal material, the mixture held between the substrates is uniformly dissolved and colorless transparent prior to the irradiation with light, but it turns into a turbid state after the irradiation with light, because light is scattered due to the difference in the refractive index between the non-oriented nematic liquid crystal material and the cured product. The device of the present invention thus prepared is operable in such a manner that when a voltage is applied, the nematic liquid crystal material will be aligned and the refractive index will agree to the refractive index of the cured product, whereby the device will be in a light transmitting state.

When the refractive index of the cured product is adjusted to agree to the refractive index ($n_x$) of the liquid crystal material, the mixture held between the substrates is colorless transparent prior to the irradiation with light because the mixture is uniformly dissolved, and it holds a light transmitting state after the irradiation with light because the refractive index of the non-oriented nematic liquid crystal material agrees to the refractive index of the cured product. The device of the present invention thus prepared is operable in such a manner that when a voltage is applied, the nematic liquid crystal material will be aligned, and the refractive index will disagree to the refractive index of the cured product, whereby light will be scattered to form a turbid state.

In the present invention, a certain color may be imparted, for instance, by incorporating a dichroic dye, a simple colorant or a pigment to the liquid crystal material, by using a colored material as the curable compound, by using colored substrates as the substrates, or by laminating a colored filter.

In the present invention, the nematic liquid crystal material is used as a solvent, and the light-curable vinyl compound is cured by irradiation with light, whereby it is unnecessary to evaporate a solvent or water during the curing. Thus, the curing can be conducted in a sealed system with high reliability, and the light-curable vinyl compound effectively serves to bond the pair of the substrates, whereby a sealing agent may not be necessary.

Thus, it is possible to employ a production method having a high productivity which comprises supplying a solution of the photo-curable vinyl compound and the nematic liquid crystal material onto one of the substrates provided with electrodes, and then overlaying the other substrate thereon, followed by irradiation with light for curing.

In particular, by using plastic substrates as the substrates provided with electrodes, it is possible to readily produce an elongated liquid crystal optical device wherein a continuous plastic film is used.

By using such a liquid crystal material uniformly distributed in a matrix of the cured product, there will be no substantial danger that the top and bottom transparent electrodes are short-circuited even when the device is made to have a large surface area. Further, it is unnecessary to strictly control the alignment or the cell gap as required by ordinary twist nematic type liquid crystal display devices. Thus, a liquid crystal light-controlling device having a large surface area may be produced with extremely good productivity. To minimize irregularities in the light transmission, the cell gap is preferably set to be constant. For this purpose, it is preferred to place a spacer for a cell gap, such as glass particles, plastic particles or ceramic particles in the space between the substrates. Specifically, such a spacer for a cell gap may be introduced as contained in the solution of the nematic liquid crystal material and the photo-curable vinyl compound, or it may be introduced before or after the supply of the solution onto one of the substrates and prior to the other substrate is overlaid thereon. In this case, pressure is preferably exerted after the overlaying, followed by curing to obtain a uniform cell gap.

Such a liquid crystal optical device may be used as a display device. However, since it is readily made to have a large surface area, and it may be cut into a desired size, it is particularly effective for use as a light-controlling device. When it is used as a light-controlling device, it is usually a transmitting mode, whereby transparent electrodes are employed. Of course, a metal lead may be provided thereto to reduce the resistance. When the device is used as a light-controlling mirror, one of the electrodes may be made to be a reflective electrode.

Various modifications may be applied to such a liquid crystal optical device. For instance, when the substrates are made of plastic or thin glass, a protective sheet made of plastic or glass may be laminated thereon for its protection, or the substrates may be made of a tempered glass, a laminated glass or a wired glass.

It is particularly preferred that a liquid crystal optical device is prepared by using plastic substrates as the substrates provided with electrodes, electrode leads are provided, the assembly is sandwiched between a pair of glass sheets which are slightly larger than the liquid crystal optical device with an adhesive material such as polyvinyl butyral interposed therebetween, then the adhesive material layer is cured by heating or radiation with light to integrate the liquid crystal optical device and the glass sheets in the form of a laminated glass. It is particularly preferred to use polyvinyl butyral as the adhesive material, whereby it is possible to obtain a structure which is very similar to a usual laminated glass.

To prepare such a liquid crystal optical device, a pair of substrates having a desired shape may be prepared and the liquid crystal optical device may be prepared by combining the pair of the substrates. Otherwise, it may be prepared by using a continuous plastic film substrate, or it is possible to employ a method wherein the device is prepared by using an elongated glass substrate, and then cut into a desired size.

A light-controlling device of such a liquid crystal optical device may be used as a building material such as a window, a skylight, a partition or a door, as a material for vehicles such as a window or a sunroof, or as a material for a casing for various electrical products, a door or a closure.

The liquid crystal optical device of the present invention may be operated in such a manner that when a voltage is applied, an AC voltage is applied to change the alignment of the liquid crystal. More particularly, an AC voltage of from 5 to 100 V at from 10 to 1,000 Hz may be applied.

When no voltage is applied, the electrodes may be open or short-circuited. It is preferred that the impedance between the electrodes i.e. the total impedance including the electrode impedance, the connection impedance at the terminals and the circuit impedance, is made lower than the impedance of the layer comprising the nematic liquid crystal material and the cured product, whereby the response of the liquid crystal material upon the switching off of the voltage is quick.

In particular, it is preferred that the impedance between the electrodes is made to be not higher than 1/10 of the impedance of the layer comprising the nematic liquid crystal material and the cured product. For this purpose, when the electrode impedance and the connection impedance at the terminals are high, it is preferred to lower the circuit impedance. By establishing such a self discharge circuit, an electric charge accumulated between the electrodes can quickly be discharged and will not hinder the movement of the liquid crystal to return to the random orientation, and the change between the transmission and the scattering will be quick, even when the capacitance of the device itself is substantially large as compared with usual liquid crystal display devices.

The device of the present invention is useful as a display device, particularly as a large surface area display device or as a curved surface display device, which used to be difficult with conventional liquid crystal display devices. Further, it is useful for many applications such as a light-controlling device with a large surface area or a light shutter. Furthermore, it is useful for an application wherein it is disposed in front of a light source such as an electric bulb to conduct switching between a fog lamp and a usual lamp electrically.

In the present invention, one of the electrodes may be used as a specular reflection electrode in the form of a mirror. In this case, the rear substrate may be made of a non-transparent glass, plastic, ceramic or metal.

Further, a color may be provided by using a colored filter or by incorporating a dichloric dye to the liquid crystal material.

Otherwise, it may be used as laminated on other display such as a TN liquid crystal display device, an electrochromic display device or an electroluminescence display device.

Thus, the display of the present invention may have various applications.

Now, the present invention will be described in further detail with reference to Examples. However, it should be understood that the present invention is by no means restricted by such specific Examples. In the Examples, "parts" means "parts by weight".

EXAMPLE 1

To 1 part of n-butyl acrylate and 5 parts of 2-hydroxyethyl acrylate, 18 parts of a liquid crystal material (E-8, manufactured by BDH Co.) and 0.12 part of benzoin isopropyl ether as a photo-cure initiator were uniformly dissolved, and the solution was injected into an ITO-provided glass substrate cell having a cell gap of 25 μm. The injection hole was sealed, and then the cell was irradiated by a ultraviolet ray irradiation apparatus (Toscure 400, trade name, manufactured by Toshiba) for about 60 seconds, whereby the entire irradiated surface turned to be turbid, and a device having liquid crystal dispersed in a resin matrix of a network structure was obtained. The transmittance prior to the application of a voltage was 18.3%, and when AC 60 V (50 Hz) was applied, the device showed a transmittance of 60.2%. (Transmittance meter: M-304, manufactured by Asahi Bunko K.K.)

EXAMPLE 2

One part of n-butyl acrylate, 3 parts of 2-hydroxyethyl acrylate, 4 parts of an acryl oligomer (M-1200, manufactured by Toa Gosei Kagaku K.K.), 0.16 part of a photo-cure initiator (Darocur 1116, trade name, manufactured by Merck Co.) and 4 parts of a liquid crystal material (E-8) were uniformly dissolved. A device was prepared in the same manner as in Example 1 except that the cell gap was changed to 10 μm. The transmittance before and after the application of a voltage (AC 60 V, 50 Hz) was 38.4% and 77.1%, respectively.

EXAMPLE 3

Three parts of n-butyl acrylate, 2 parts of an acryl oligomer (Viscoat #823, trade name, manufactured of Osaka Yuki Kagaku K.K., viscosity: 19,000 cps/50° C.), 3 parts of a liquid crystal material (E-8) and 0.1 part of a photo-cure initiator (Darocur 1116) were uniformly mixed, and the mixture was coated on an ITO-provided polyester film by means of a doctor blade. A spacer of 10 μm was applied thereto, and then an ITO-provided polyester film was overlaid thereof. Then, irradiation was conducted under the same conditions as in Example 1 to obtain a device. The transmittance before and after the application of a voltage (AC 60 V, 50 Hz) was 42.8% and 67.1%, respectively.

EXAMPLE 4

One part of n-butyl acrylate, 5 parts of 2-hydroxyethyl acrylate, 3 parts of an acryl oligomer (M-6200, manufactured by Toa Gosei Kagaku K.K., viscosity: 240 cps/50° C.), 0.20 part of a photo-cure initiator (Darocur 1173, trade name, manufactured by Merck Co.) and 18 parts of a liquid crystal material (E-8) were uniformly dissolved. A device was prepared in the same manner as in Example 1 except that the thickness of the glass sheet for the cell was changed to 3.0 mm, and irradiation with light was changed to 3 minutes. The transmittance before and after the application of a voltage (AC 60 V, 50 Hz) was 8.3% and 52.0%, respectively.

EXAMPLE 5

One part of N-(n-butoxymethyl)acrylamide, 3 parts of n-butyl acrylate, 0.2 part of a photo-cure initiator (Darocur 1116) and 9.5 parts of a liquid crystal material (Tn-623, manufactured by Roche Co.) were uniformly dissolved. A device was prepared in the same manner as in Example 1 except that the cell gap was changed to 10 μm. The transmittance before and after the application of a voltage (AC 60 V, 50 Hz) was 79.1% and 85.0%, respectively.

EXAMPLE 6

Twelve parts of n-butyl acrylate, 24 parts of an acryl oligomer (M-1200, manufactured by Toa Gosei Kagaku K.K.), 1.4 parts of a photo-cure initiator (Darocur 1116) and 64 parts of a liquid crystal material (E-8) were uniformly dissolved. A spacer of 14 μm was added and thoroughly dispersed therein. The mixture was coated on an ITO-provided polyester film, and then an ITO-provided polyester film was overlaid thereon. Then, irradiation was conducted by a ultraviolet irradiation apparatus (Neolumisuper (30 W), trade name, manufactured by Mitsubishi Denki K.K.) for about 90 seconds to obtain a device.

The transmittance when no voltage was applied was 10%, and the transmittance during the application of a voltage was 67.0% (AC 15 V, 50 Hz) and 81.0 parts (AC 100 V, 50 Hz).

Further, this device was sandwiched between a pair of a glass sheet with a pair of a polyvinyl butyral layer interposed therebetween, and the assembly was heated and pressed in an autoclave for integration.

The integrated device was safe against a pressure from outside and highly reliable.

EXAMPLE 7

A device was prepared in the same manner as in Example 6 except that the thickness of the spacer was changed to 8 μm. The transmittance when no voltage was applied was 20%, and the transmittance during the application of a voltage was 77.0% (AC 15 V, 50 Hz), 79.0% (AC 30 V, 50 Hz).

EXAMPLE 8

With the device of Example 6, the response time in the change of the transmittance was 1.2 seconds when the circuit was opened from the state where a voltage of 50 V was applied. After switching off the voltage, the electrodes of the device were short-circuited with a resistance of 1 kΩ, the response time was 0.02 second.

EXAMPLE 9

A device was prepared in the same manner as in Example 6 except that 1.5 parts of a colored curable material (Bestcure 161, trade name, manufactured by Toka Shikiso Kagaku Kogyo K.K.) was added and dispersed.

A device colored uniformly over the entire surface was obtained. The transmittance when no voltage was applied was 7.5%, and the transmittance during the application of a voltage was 65.8% (AC 100 V, 50 Hz).

EXAMPLE 10

Seven parts of n-octyl acrylate, 15 parts of 2-hydroxyethyl acrylate, 14 parts of acryl oligomer (M-1200, manufactured by Toa Gosei Kaguaku K.K., viscosity: 30,000 cps/50° C.), 3 parts of benzoin isopropyl ether as a photo-cure initiator and 64 parts of a liquid crystal material (E-8) were uniformly dissolved. This solution was coated on an ITO-provided polyester film substrate tentatively adhered to a glass plate, and then an ITO-provided polyester film substrate likewise tentatively adhered to a glass plate was overlaid thereon to have a cell gap of 14 μm. Then, irradiation was conducted by a ultraviolet ray irradiation apparatus (Toscure 400, trade name, manufactured by Toshiba) for about 60 seconds to obtain a device with the irradiated surface being turbid. The transmittance prior to the application of a voltage was 15.9%, and upon application of AC 100 V (50 Hz), the transmittance became 77.0%.

EXAMPLE 11

One part of N-(n-butoxymethyl)acrylamide, 3 parts of n-butyl acrylate, 1 part of acryl oligomer (Viscoat #823), 0.2 part of a photo-cure initiator (Darocur 1116) and 9.5 parts of a liquid crystal material (Tn-623, manufactured by Roche Co.) were uniformly dissolved. A device was prepared in the same manner as in Example 5. The transmittance before and after the application of a voltage (AC 60 V, 50 Hz) was 76.2% and 85.2%, respectively.

In this device, an acryl oligomer was used as a starting material. As compared with the device obtained in Example 5, fine cracks after the curing were less, and the change in the transmittance upon application of a voltage was large.

As described in the foregoing, the present invention provides a novel liquid crystal optical device and a process for its production, and a method for operating such a liquid crystal optical device. The liquid crystal optical device useful as a light-controlling device is prepared by irradiating light to a uniformly dissolved state of a nematic liquid crystal material and a photo-curable vinyl compound selected so that the refractive index of the resulting cured product agrees to either the ordinary refractive index ($n_0$) or the extraordinary refractive index ($n_e$) of the nematic liquid crystal material used, or the refractive index ($n_x$) of the nematic liquid crystal material when it is randomly oriented, held between a pair of substrates provided with electrodes, to cure the photo-curable compound and fix the resulting phase separation of the nematic liquid crystal material and the cured product. Thus, the present invention does not require a polarizing film and presents a device having excellent quality of the outer appearance and high productivity. It is useful for a display, particularly for a display having a large surface area or a curved surface, and it has also a wide range of application e.g. as a light-controlling device with a large surface area and as a light shutter.

Since a light-curable vinyl compound is used in the present invention, the device is highly reliable, and since it has a structure of a laminated glass, it is highly safe and being hardly susceptible to breakage by a pressure from outside.

Further, the safety will be improved by providing a protective sheet on at least one side of the substrates. The device will be hardly breakable when such a protective sheet is provided on each side.

By supplying a solution of the nematic liquid material, the photo-curable vinyl compound and optionally a photo-cure initiator onto one of the substrates and overlaying the other substrate thereon, a device having a large surface area can readily be prepared with high productivity. Accordingly, even in the case of glass substrates, fairly elongated substrates may be employed, and in the case of plastic substrates, it is possible to employ a continuous process by using continuous plastic films.

Especially when plastic substrates are used as the substrates, the strength will be poor although the productivity wil be high, and when made to have a large surface area, the device will be susceptible to breakage or likely to be bent. Therefore, it is effective to provide a protective sheet on each side. It is particularly preferred to use a glass sheet as the protective sheet, and by bonding a glass sheet by means of an adhesive material, it is possible to obtain a structure similar to a laminated glass, which is highly safe and reliable.

In the liquid crystal optical device of the present invention, the liquid crystal material and the cured vinyl compound form a fine three-dimensional network matrix, and such a device can be cut into a desired size for use.

The present invention can be used for various other applications within a range where the effects of the present invention will not be impaired.

What is claimed is:

1. A liquid crystal optical device comprising a pair of substrates provided with electrodes and a layer containing a liquid crystal material sandwiched between the pair of substrates, wherein said layer is formed by irradiating light on a solution of a nematic liquid crystal material and a photo-curable vinyl compound selected so that the refractive index of the resulting cured product agrees with either the ordinary refractive index ($n_0$) or the extraordinary refractive index ($n_e$) of the nematic liquid crystal material used, or the refractive index ($n_x$) of the nematic liquid crystal material when it is randomly oriented, held between the pair of substrates provided with electrodes, to cure the photo-curable vinyl compound and fix the resulting phase separation of the nematic liquid crystal material and the cured product, wherein said photo-curable vinyl compound contains from 15 to 70% by weight of an acryl oligomer.

2. The liquid crystal optical device according to claim 1, wherein the photo-curable vinyl compound is selected so that the refractive index of the resulting cured product agrees to the ordinary refractive index ($n_0$) or the extraordinary refractive index ($n_e$) of the nematic liquid crystal material used.

3. The liquid crystal optical device according to claim 1, wherein the photo-curable vinyl compound is selected so that the refractive index of the resulting cured product agrees to the ordinary refractive index ($n_0$) of the nematic liquid crystal material used, and the nematic liquid crystal material has a positive dielectric anisotropy.

4. The liquid crystal optical device according to claim 1, wherein the layer containing a liquid crystal material contains a spacer to secure a cell gap.

5. The liquid crystal optical device according to claim 1, wherein the substrates provided with electrodes are substrates provided with transparent electrodes.

6. The liquid crystal optical device according to claim 1, wherein the substrates provided with electrodes are plastic substrates provided with transparent electrodes.

7. The liquid crystal optical device according to claim 6, wherein a protective sheet is laminated on the outer side of at least one of the plastic substrates.

8. The liquid crystal optical device according to claim 6, wherein a protective sheet is laminated on the outer side of each of the plastic substrates.

9. The liquid crystal optical device according to claim 8, wherein the protective sheet is a glass sheet.

10. The liquid crystal optical device according to claim 9 wherein the glass sheet is bonded by polyvinyl butyral to each plastic substrate integrally in the form of a laminated glass.

11. A process for producing a liquid crystal optical device, which comprises supplying a mixture of a liquid crystal material and a resin between a pair of substrates provided with electrodes and curing the mixture, wherein used as said material is a solution of a nematic liquid crystal material and a photo-curable vinyl compound selected so that the refractive index of the resulting cured product agrees with either the ordinary refractive index ($n_0$) or the extraordinary refractive index ($n_e$) of the nematic liquid crystal material used, or the refractive index ($n_x$) of the nematic liquid crystal material when it is randomly oriented, and the solution is held between the pair of substrates provided with electrodes and irradiated with light to cure the photo-curable vinyl compound and fix the resulting phase separation of the nematic liquid crystal material and the cured product, wherein said photo-curable vinyl compound contains from 15 to 70% weight of an acryl oligomer.

12. The process according to claim 11, wherein the photo-curable vinyl compound is selected so that the refractive index of the resulting cured product agrees to the ordinary refractive index ($n_0$) or the extraordinary refractive index ($n_e$) of the nematic liquid crystal material used.

13. The process according to claim 11, wherein the photo-curable vinyl compound is selected so that the refractive index of the resulting cured product agrees to the ordinary refractive index ($n_0$) of the nematic liquid crystal material used, and the nematic liquid crystal material has a positive dielectric anisotropy.

14. The process according to claim 11, wherein the solution of the nematic liquid crystal material and the photo-curable vinyl compound is supplied onto one of the substrates provided with electrodes, and then, the other substrate is overlaid thereon, followed by the irradiation with light to cure the photo-curable vinyl compound.

15. The process according to claim 14, wherein a spacer to secure a cell gap is introduced together with the solution, or before or after the supply of the solution onto one of the substrates and prior to the overlaying of the other substrate.

16. A method for operating a liquid crystal optical device comprising a pair of substrates provides with electrodes and a layer containing a liquid crystal material sandwiched between the pair of substrates, wherein a liquid crystal optical device prepared by irradiating light to a solution of a nematic liquid crystal material and a photo-curable vinyl compound selected so that the refractive index of the resulting cured product agrees to either the ordinary refractive index ($n_0$) or the extraordinary refractive index ($n_e$) of the nematic liquid crystal material used, or the refractive index ($n_x$) of the nematic liquid crystal material when it is randomly oriented, held between the pair of substrates provided with electrodes, to cure the photo-curable vinyl compound and fix the resulting phase separation of the nematic liquid crystal material and the cured product, is used, and wherein when a voltage is to be applied, an AC voltage is applied, and when no voltage is applied, the two electrodes are short-circuited with an impedance lower than the impedance of the layer comprising the nematic liquid crystal material and the cured product.

* * * * *